3,567,424
CHEMICAL REGULATION OF PLANT PROTEIN CONTENT
Stanley K. Ries, East Lansing, Mich., assignor to The Battelle Development Corporation, Columbus, Ohio
No Drawing. Filed Feb. 8, 1968, Ser. No. 703,893
Int. Cl. A01n 5/00
U.S. Cl. 71—93                                      9 Claims

ABSTRACT OF THE DISCLOSURE

Chemical regulation of plant protein content through growing a susceptible crop plant in an environment containing a low-level, non-phytotoxic concentration of a certain organic chemical agent and a nitrate source of a nitrogen plant nutrient with the certain organic chemical agent being a particular triazine, uracil, or phenyl-substituted urea, and preferably being simazine.

---

This invention relates to metabolic control of the protein content of susceptible crop plants through the employment of a low-level, non-phytotoxic concentration of certain agents. More particularly, the invention involves an increasing of the total protein content per susceptible crop plant, or an increasing of the total protein yield per unit of tilled land, through an agricultural application of certain organic chemical agents in low-level, non-phytotoxic amounts in conjunction with particular plant nutritional parameters.

A need exists for increasing food supplies because of a rapidly and ever-increasing population throughout the world. Fulfillment of this need is a salutory goal with a continuing effort for discovery of new agricultural practices enabling an increased yield of plant protein per unit of arable land. It is to fulfilling this need that the present invention is of great utility.

In the past, food supplies obtained through agricultural endeavors have been augmented through use of fertilizers, utilization of genetic principles in the improvement of plant species, the use of pesticides, the use of plant-growth regulators, e.g., herbicides, and like practices.

As will be apparent from what follows later herein wherein those certain organic chemical agents useful for practice of the invention are described, the useful agents are known materials which in the past have been used as herbicides in amounts generally of from 2 to 10 times or more the maximum amount requisite for practice of the present invention. Herbicides, as conventionally known, are used to destroy and/or inhibit unwanted plant growth, such as to selectively kill weeds while not injuring crop plants. Through control of the weeds, the desired plant crop is freed from competition for available plant nutrients and in other manners plant growth is favorably influenced so as to enable increased crop yields to be obtained.

The utilization of organic herbicides has become a commonplace agricultural practice within about the past thirty years. Widespread employment of herbicides was stimulated by the discovery of a differential herbicidal activity of 2,4-D (2,4-dichlorophenoxyacetic acid) on various plants. Since that time numerous other organic herbicides also have become commonplace with their herbicidal utility also predicated upon differential herbicidal activity for various plants.

Different plants generally vary in susceptibility or tolerance to the same herbicide. For any plant, its susceptibility or tolerance generally varies also during its various stages of growth and development. The same plant also may have differing tolerance and susceptibility levels to different herbicides. A lot remains unknown as to specific susceptibility and tolerance levels for a particular plant to a particular herbicide at a particular stage of development of the plant. For each organic herbicide there exists a minimum amount which is toxic to a particular plant upon being taken up by the plant at a particular stage of the plant's development. For purposes of this invention that toxic amount of herbicide is designated to be the phytotoxic amount. Slightly below that lethal amount, symptoms of damage to the plant may be noted, such as chlorosis and a stunting of growth, but the plant itself is not killed. In herbicidal applications employed for weed control or killing purposes, the herbicide is employed in an amount inadequate to significantly damage and/or kill the crop plant, while still being adequate to control or kill the weed or unwanted plant species. This is possible because of the difference in susceptibilities of the crop plants and unwanted plants to the particular herbicide. A suitable choice of herbicides for herbicidal purposes generally involves employment of the herbicide at a time and in an amount lethal to the unwanted plants or weed which amount also is noninjurious to the crop plant.

Various organic herbicides are employed successfully for weed control for field crops, such as wheat, oats, rye, rice, maize, and the like; for vegetable crops, such as carrots, asparagus, beans, celery, lettuce, cabbage, peas, potatoes, onions, and the like; for ornamental, fruit and nursery crops, such as strawberry plants, raspberries, blackberries, currants, blueberries, apple trees, peach trees, and the like; and for forage crops, pastures, and rangelands, for legumes, such as alfalfa and clover, and for various grass seedings, and for the like. Time and frequency of application of particular herbicide depends greatly on the particular herbicide and the particularly desired plant crop and weeds to be controlled. Application may be prior to planting as by working into the soil after application thereto, at the time of emergence, after the plant has emerged, at various plant growth stages such as pre- or post-flowering, after transplating, when weeds reach certain growth stages, etc. Frequently the herbicide is ap-applied in an aqueous or organic liquid medium, in a dissolved, dispersed, or suspended form. In other instances a gaseous herbicide may be applied and in still others the herbicide is applied in a solid form as by admixing with a solid carrier. Application may be overall or to selective areas. Amounts applied for weed control depend greatly on the particular herbicide, its time of application, the particular weeds to be controlled, and the particular plant crop being cultivated. Generally amounts of herbicides are applied of between 1 to 10 lbs. or more of active ingredient per acre. In a few instances smaller amounts of herbicides are recommended, such as MCPA (4-chloro-2-methylphenoxacetic acid) at a rate of ¼ lb./acre for weed control of peas which are 4 to 8 in. high, or such as an overall spray of ⅓ lb./acre of 2,4-D ester for weed control of sweet corn which is not over 6 in. high. Application of smaller amounts of herbicides generally are considered unsatisfactory for weed control.

Heretofore, there have been some reports of enhanced growth and/or increased nitrogen contents for some plants from some applications of some herbicides. Increased protein contents have been reported in a few plants from some applications of a few herbicides. Quite frequently these protein content increases have been attributed to a translocation or altered distribution of the nitrogen content from one portion of the plant to another portion. In other instances there exists a doubt of any valid net increased protein content per plant being obtained with observed increased plant nitrogen or protein nitrogen being deemed mere artifact of plant growth inhibition. In the noted occasional reports of increased protein yields, the plants being evaluated were tolerant rather than susceptible, to the particular herbicide used; and additionally the controls for basing the determination of the increases were not grown under usual cultural practices wherein weeds were controlled. Those reported increases lack conclusiveness in that they also can be accounted for by a lack of weed competition with the treated plant. The prior art reports also make apparent that the reported treatments altered metabolic processes with significant alteration in the ratios of the various fractions comprising the plants's protein. In "The Physiology and Biochemistry of Herbicides," edited by L. J. Andrus, 1964, Academic Press, Inc., London, England, pp. 313–318, there is found a recent survey and analysis which along with the references cited therein, aids in illustrating the state of the art. Also serving to illustrate the state of the art are two references by S. K. Ries, et al., "Weeds," vol. 11, No. 4, October 1963, pp. 270–273, and vol. 13, No. 3, July 1965, pp. 272–274, and references cited therein. Several more recent articles, "Plant Physiology," (1967), 42, pp. 280–282, and "Proceedings of the National Academy of Sciences," vol. 58, No. 2, pp. 526–532, August 1967, co-authored by the present inventor cite references therein which further aid in analysis and understanding of the state of the art. In general from the prior art, one can conclude that: (a) certain herbicides with certain plants sometimes provided increased growth, plant nitrogen content, and different protein content; (b) such results did not consistently occur and were not consistently reproducible; (c) the few reported protein increases were not extremely large, generally were accompanied by alteration of the protein character, and could be accounted for by accompanying translocation of protein within the plant or a lack of valid weed-free-grown controls, or the like; and (d) conditions and parameters and agents for consistently growing susceptible plants of increased total protein content were not known.

For purposes of the invention a crop plant is a plant having a nutritional protein value for human and/or animal consumption. Such nutritional value may be present in the crop plant's roots, e.g., beets, carrots, etc.; in its foliage, e.g., ryegrass, hay, etc.; in its seed, e.g., various grains, etc., or in its fruit, e.g., apples, berries, etc, and the like. For purposes of this invention a susceptible crop plant is a crop plant which will be killed in the field in its seedling and/or germinating-seed stage of development or growth by application of the particularly employed certain organic chemical agent in an amount of 2 lbs./acre. Based upon the foregoing definitions it is within the skill of the art to readily determine and classify plants as to whether they meet the above requirements and be crop plants and susceptible crop plants in particular. The art recognizes certain plants to be crop plants which are physiologically resistant (i.e., be tolerant plants) by one mechanism or another to various of the certain organic chemical agents employed in the invention. Such tolerant crop plants usually are not killed in the field in their seedling and/or germinating seed stages of development or growth by application of 2 lbs./acre and sometimes even larger amounts of the agent. As illustrative thereof, corn, asparagus, and the like, are recognized to be very tolerant or resistant to simazine, and are not susceptible crop plants for purposes of the invention when employing simazine as the certain organic chemical agent in practice of the invention.

The method of the invention comprises cultivating a susceptible crop plant in the presence of a nitrate source of a nitrogen plant nutrient and in the presence of a low-level, non-phytotoxic amount of certain organic chemical agents. This low-level, non-phytotoxic amount varies somewhat depending on the particularly employed certain organic chemical agent, and the time at which the treatment is made or the particular stage of development or growth of the susceptible crop plant at the time of application. In general, an effective amount is employed, which effective amount does not exceed one-half of the amount phytotoxic to the susceptible crop plant at the time or particular stage of its development or growth when the treatment is made. As stated earlier, a susceptible crop plant in its seedling and/or germinating-seed stage of development will be killed in the field upon application of the particularly employed certain organic chemical agent in the amount of 2 lbs./acre. At that specific early stage of development or growth the maximum employable effective amount does not exceed an application rate of about ½ lb./acre. Please note that the specific limit on the maximum employable amount is based on the phytotoxic amount and, if at the seedling stage of development or growth the actual phytotoxic amount be less than 2 lbs./acre, then one-half of such actual phytotoxic amount is the upper limit on the employable maximum effective amount. Also note that the amount phytotoxic or lethal to the susceptible crop plant usually changes as the plant grows and develops with larger amounts generally required to kill maturing and mature susceptible crop plants. Accordingly at such other stages of development or growth of the susceptible plant crop, the maximum effective amount employable for treatment then will differ accordingy from the maximum effective amount employable at its seedling and/or germinating-seed stage of development or growth. Amounts of the certain chemical agent between one-half to one times the phytotoxic amount at the time of treatment are unsatisfactory and generally inoperable in providing the advantages of the invention. Such larger amounts sometimes provide changes in the plant's protein, but rarely an increase in total protein yield per unit of tilled land and even then the harvested plant exhibits significant plant damage or injury, such as a stunted growth.

Preferably the employed amount of the certain organic chemical agent is between one-fourth to one-eighth the amount thereof phytotoxic to the susceptible crop plant at its time of application. There appears to be a minimum effective amount employable to provide the advantages of the invention, although for some agents and with some plants amounts as low as one-sixty-fourth lb. and lower per acre are useful. A practical lower limit as to the minimum effective amount is about one-thirty-second lb./acre in that lower amounts rarely provide significant total protein increases.

The invention includes an environment for growing a susceptible crop plant of increased total protein content, which environment comprises:

(a) a nitrate source of a nitrogen plant nutrient; and
(b) an effective amount of up to one-half of the phytotoxic amount of an organic chemical agent which is a triazine, or uracil, or phenylsubstituted urea.

The cultural environment for practice of the invention requires the presence of a nitrate source of nitrogen. In most instances this can be provided, should the cultural environment be deficient thereof, by fertilization with an appropriate nitrogen-containing fertilizer. Since many fertilizers are degraded, as by bacteria or the like, or otherwise altered in the soil to a nitrate form for assimulation and utilization by the plant, the appropriate nitrogen-containing fertilizer need not contain a nitrate per se as a constituent thereof, although the same are highly useful, but only need be a fertilizer capable of providing a nitrate nitrogen source to the plant during its assimulation and utilization for the plant growth. Useful fertilizers may contain such nitrogen-bearing constituents as: potassium nitrate, ammonium nitrate, urea, ammonium sulfate, anhydrous ammonia, sodium nitrate, calcium nitrate, and the like. In the instances where the plant cultivation be in a sterile environment, as through laboratory or greenhouse cultivation with a root nutrient solution, a supplying of the nitrogen source by the ammonium ion, such as by an ammonium sulfate fertilizer, will not provide a suitable source of nitrate nitrogen unless a means also be provided to convert some of such fertilizer to a nitrate form for plant assimilation.

It is not uncommon in many regions of the world for plant nutrients in the soil to be limiting and also for fertilizers to be in short supply and therefore utilized very little. It is also not uncommon for many regions not to be blessed with optimum temperatures for growing susceptible plant crops. In all such regions the present invention is of great utility. Practice of the invention can insure against nitrogen deficiency for plant growth by better usage of low-available nitrogen. The applied low-level, non-phytotoxic amounts of the certain organic chemical agents will increase the total plant protein yield quite dramatically in such regions and be an economical treatment not in conflict with cultural mores. For example, application of from one-eighth to one-fourth the phytotoxic amount per acre of the certain organic chemical agent to susceptible crop plants having only 30 lbs. $N_2$/acre available during growing can provide equal to greater total protein yields than that of those plants having as high as 60 lbs. $N_2$/acre available during growing except not treated in accordance with the invention. Even in more favorable agricultural regions of the world, the growth of susceptible crop plants frequently are limited by nitrate availability and growing temperatures. In such regions where nutrients are not usually deficient, advantages of the invention abound. As high as 160 lbs. of available $N_2$/acre are frequently required at cool temperatures, i.e., temperatures below optimal growing temperatures, so that the plant's respiration system can supply each 10 lbs. $N_2$ to the plants. Because of this large amounts of nitrogen fertilizer frequently are applied, amounts in excess of those required at optimal growing temperatures to assure sufficient available nitrogen during periods of suboptimal growing temperatures. Evidence to date indicates that practice of the invention significantly reduces the need for the presence of a high nitrogen level during suboptimal growing temperatures to enable optimum growth. Thus, the present invention permits a drastic reduction in fertilizer requirements with in some instances the nitrogen fertilizer application requirements being able to be cut in half and lower through practice of the invention whereby more efficient usage is made of available nitrogen nutrients at suboptimal growing temperatures. For purposes of the invention suboptimal growing temperatures for a susceptible crop plant are temperatures below those recognized as required for optimum growth. In "Cereal Crops," Leonard and Martin, 1963, MacMillan and Company, New York, N.Y., there are given optimum growing temperatures for a number of plant crops.

In practicing the invention plant protein content is enhanced through a providing of plant foodstuffs of increased protein content per unit dry weight. This is an increase in total protein per unit plant and, correspondingly, an increased yield of protein per unit of tilled land. In defining increased total protein yield there is meant an increased yield by comparison to like plants grown under identical conditions except for no inclusion in their production of the practice of the invention taught herein. The produced plant is of increased protein content per unit weight and is a plant foodstuff of higher-than-normal protein content. In most instances and preferably so, the plant produced through practice of the invention is of equivalent or larger than the size of like plants grown under like conditions except for an inclusion in their production of the practice of this invention. In a few instances somewhat smaller-size plants are produced in practice of the invention, with this observed most frequently as the employable maximum effective amount of the certain organic chemical agent is approached. In such instances the increased protein per unit weight of dry plant need be significantly large enough to make up for the minor decrease in plant size so as to provide the increased total protein yield.

In practicing the invention, so long as one observes the herein taught non-phytotoxic, low-level concentrations of the particular organic chemical agent in combination with the herein taught presence of a nitrate source of a nitrogen plant nutrient, the useful application techniques, apparatuses, methods, and the like, can be those conentionally used for application of herbicides for herbicidal purposes. Thus, the organic chemical agent may be applied in the form of a suspension, dispersion or solution in an aqueous or organic medium. Likewise it may be applied as a gas or in a solid form such as by admixture in a solid carrier. All such forms and manners of application are not necessarily equally useful and an appropriate selection of the most useful can readily be made upon due consideration of the particular agent being employed, the particular susceptible plant crop being treated, the time of application, and the like. Where the plant cultivation be in a nutrient solution, the nutrient solution itself provides a ready vehicle for incorporation of the particularly employed agent therein so that upon subsequent contacting of the crop plant with the nutrient results in the treatment. Likewise when irrigation control is used in crop plant cultivation, the irrigating waters provide a ready means for incorporation of the requisite amount of employed agent. Correspondingly in field applications, a suitable amount may be admixed with or otherwise incorporated with fertilizing components, if fertilizer be applied to or incorporated in the soil, so as to place the requisite amount at a location so that the plant treatment results. Also in field applications, conventional spraying and dusting techniques and the like can be employed. In such instances the agriculturist is somewhat at the mercy of the weather and the natural environment. Generally there is little plant uptake of the applied organic chemical agent upon direct contact with plant foliage or emerging shoot or stems. Superior protein promotion advantages of the invention result when the agent is available to the plant's roots and the uptake of the employed herbicide be by the crop plant's roots. Accordingly of great utility and preferred are embodiments of the invention wherein the agent be placed in the soil for subsequent absorption by roots of the crop plant. These contemplated treatments include field applications of tilling or otherwise placing a suitable concentration of the agent in the soil pror to, or at, or after planting of the crop plant at a location where the plant roots be or will form, or at a location where rainfall or the like will readily transfer requisite amounts to the situs of the plant's roots. A contemplated embodiment comprises employing plant seeds coated with or admixed with a suitable amount of the agent so as to place a requisite amount available at the situs of plant root formation. For superior results in practice of the invention, desirably the crop plant should be continuously subjected to the treatment of the invention from germination to harvest. With a relatively continuous treatment, the largest enhancements of total plant protein result. Relatively continuous treatments are obtainable through frequent application of suitable amounts, being careful that accumulations by the plant do not exceed parameters of the method of the invention, and also through application of forms of the agent which release or transfer over extended periods of time the requisite amounts for take-up by the plant. Of course as will be apparent from other teachings herein and especially the specific examples, advantages of the invention are obtained through other than under a continuous treatment of the crop plant from termination to harvest. At this stage of development of the invention there has not been a full determination of a particular time or times of plant growth whereat the treatment will provide optimum protein enhancement, if the treatment not be relatively continuous from germination to harvest. However, one skilled in the art by ready experimentation and trial can determine such optimum treatment times for various plants and employed agents by following the teachings and examples herein.

The useful certain organic chemical agents for practice of the invention comprise certain triazines, uracils, and phenyl-substituted ureas. Particularly preferred are the certain triazines with simazine being especially preferred.

The useful triazines are of the general structure of

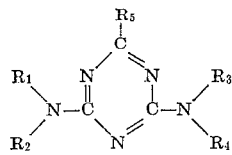

wherein:

R₁ and R₃ generally represent the hydrogen atom, although one or both may be the ethyl radical, R₂ and R₄ represent lower alkyl radicals, which be the same or different, and generally represent the ethyl or isopropyl radicals, and R₅ represents a halogen atom, generally the chlorine atom, or a methylmercapto radical.

Illustrative and representative of known triazines for use in the invention, although the listing below is not necessarily inclusive of all are the following:

| Chemical name: | Common name [1] |
|---|---|
| 2-chloro-4,6-bis(ethylamino)-1,3,5-triazine | *Simazine* |
| 2-chloro-4-ethylamino-6-isopropylamino-1,3,5-triazine | *Atrazine* |
| 2-chloro-4,6-bis(isopropylamino)-1,3,5-triazine | *Propazine* |
| 2-chloro-4,6-bis(diethylamino)-1,3,5-triazine | *Chlorazine* |
| 2-chloro-4-diethylamino-6-ethylamino-1,3,5-triazine | *Trietazine* |
| 2-chloro-4-diethylamino-6-isopropylamino-1,3,5-triazine | *Ipazine* or Isodiazine |
| 2-methylthio-4-isopropylamino-6-ethylamino-1,3,5-triazine | *Ametryne* |
| 2-methylthio-4,6-bis(isopropylamino)-1,3,5-triazine | *Promtryne* or Propatrin |
| 2-methylthio-4,6-bis(ethylamino)-1,3,5-triazine | *Simetryne* or Simatrin |
| 2-methylthio-4-ethylamino-6-isopropylamino-1,3,5-triazine | Atratryne or Altratrin |

[1] An italic common name has been approved by one or both of the British Standards Institution or the Weed Society of America.

In describing and claming the invention herein, the agents of concern in most instances for purposes of brevity have been referred to by their common name as is well understood in the herbicide art. It is to be understood that the specific chemical name and its specific common name are interchangeable and both identify the same agent for purposes of describing and claiming the invention.

The useful uracils are of the general structure of:

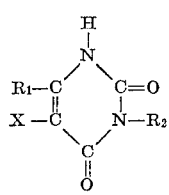

wherein:

R₁ and X together are a lower alkene radical, generally the propylene radical, or separately X represents a chlorine or bromine atom, and R₁ represents the methyl radical, and whether R₁ and X are together or separate then, R₂ is the isopropyl radical, or the sec- or tert-butyl radical, or the cyclohexyl radical.

Illustrative and representative of, but not necessarily inclusive of all uracils for use in the invention, are the following:

| Chemical name: | Common name [1] |
|---|---|
| 5-bromo-3-isopropyl-6-methyl uracil | Isocil |
| 5-bromo-3-sec-butyl-6-methyl uracil | *Bromoacil* |
| 5-chloro-3-tert-butyl-6-methyl uracil | Terbacil |
| 3-cyclohexyl-5,6-trimethylene uracil | Venzar |
| 5-bromo-3-tert-butyl-6-methyl uracil | — |

[1] Supra.

The useful phenyl-substituted ureas are of the general structure of:

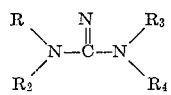

wherein:

R₁ represents the phenyl radical, or the 4-bromophenyl radical, or the 4-chlorophenyl radical, or the 3,4-dichlorophenyl radical, or the 4-(p-chlorophenoxy) phenyl radical, or the m-trifluoromethylphenyl radical, R₂ represents the hydrogen atom, R₃ represents the hydrogen atom, or the methyl radical, or n-butyl radical, and R₄ represents a lower alkyl radical such as the methyl or n-butyl radical, or a lower alkoxy radical such as the methoxy radical, or the 2-methyl cyclohexyl radical.

Illustrative and representative of, but not necessarily inclusive of all known ureas for use in the invention are the following:

| Chemical name: | Common name [1] |
|---|---|
| 3-(3,4-dichlorophenyl)-1,1-dimethylurea | *Diuron* |
| 3-(3,4-dichlorophenyl)-1-methoxy-1-methylurea | Linuron |
| 3-(p-chlorophenyl)-1,1-dimethylurea | *Monuron* or CMU |
| 3-phenyl-1,1-dimethylurea | *Fenuron* or PDU |
| 3-(3,4-dichlorophenyl)-1-n-butyl-1-methylurea | *Neburon* |
| 3-(4-bromophenyl)-methyl-1-methoxyurea | Metabromuron |
| 3-(m-trifluoromethylphenyl)-1,1-dimethylurea | Fluorometuron or Cotoran |
| 1-(2-methylcyclohexyl)-3-phenylurea | *Siduron* |
| N-(4(p-chlorophenoxy)-phenyl)-N',N'-dimethylurea | *Chloroxuron* |
| 3-(p-chlorophenyl)-1,1-dimethylurea trichloroacetate | Urox or *Monuron* TCA |
| 3-phenyl-1,1-dimethylurea trichloroacetate | Urab or *Fenuron* TCA |

[1] Supra.

While at this time it is not fully understood how the certain organic chemical agents function metabolically to induce and provide increased total protein yields in the susceptible crop plants, the following may aid in understanding the invention. With the employed requisite amounts of the agent, the plants accumulate up to 80 percent or more water extractable protein per plant; their nitrate content and nitrate reductase activity increase many fold; and here also is a slight increase in respiration and a decrease in the rate of carbohydrate accumulation. None of those responses, however, are observable unless there be present a nitrate source of a nitrogen plant nutrient. The agent promotes an increase in the accumulation of nitrate. The elevated nitrate level induces a higher level of nitrate reductase, so that nitrate is reduced to nitrite at a higher rate. The nitrite is rapidly further reduced to the oxidation level of $\alpha$-amino groups. The increase in nitrogen available for transamination results in increased amino acid synthesis, which in turn increases the rate of amino acid polymerization. The uptake and reduction of nitrate to amino groups and polymerization require energy which may be obtained by carbohydrate oxidation. This is a possible explanation for the sometimes observed dry weight decrease in response to the agent since dry weight is primarily a reflection of carbohydrate bulk. The increased respiration rate can also be interpreted to be indicative of a greater energy requirement in the treated cells. These effects have been established in several members of both the grain and legume families under normal agricultural conditions both in Michigan and Costa Rica as will be apparent from data in specific examples following later.

Further aiding in substantiating the foregoing understanding of how the invention functions are data reported in "Plant Physiology" (1967), 42, pp. 280–282, co-authored by the present inventor. Corn, a nonsusceptible crop plant as to the simazine employed for its treatment, was studied in the work therein described.

In that work, corn (Zea mays L., cultivar Michigan 400) was germinated at 25°. After 10 days, the seedlings were washed free of sand and the endosperm removed to induce nitrogen deficiency. The plants were placed into 500 ml. jars containing a nutrient solution containing $KNO_3$ to supply nitrogen as the nitrate ion. The solutions were prepared according to the procedure of Hoagland and Arnon (Univ. Calif. Agr. Expt. Sta. Circ. 347 (1938)). All nutrient cultures were adjusted to pH 6.5 with 10% (w./v.) KOH. The aerated nutrient solutions were replaced every 48 hours to maintain relatively constant nutrient levels.

Plants were maintained in controlled environment chambers at 28° for a 16 hour day, and 22.5° for an 8 hour night to simulate normal growing conditions. The chambers provided a light intensity of 2,000 ft.-c. from fluorescent and incandescent bulbs. Plants also were maintained at temperatures decreased to 22.5° day and 17° night, 10 to 14 days after transplanting to simulate suboptimal growing conditions. Plants of uniform size were selected for replicates at the time the two temperature regimes were established in the growth chambers. Simazine treatments were made to each replicate by adding aliquots of a 0.24 mN. stock solution to the nutrient solution. The plants were harvested 7 to 8 days following simazine treatment, dried, weighed, and the nitrogen determined by a micro-Kjeldahl procedure (Association of Official Agricultural Chemists. 1955. Official Methods of Analysis of the Association of Official Agricultural Chemists. Published by Association of Official Agricultural Chemists, Washington, D.C., 5th Edition. 805–806).

With the employment of a 4 $\mu$M. concentration of simazine (2-chloro-4,6-bis (ethylamino)-1,3,5-triazine) and a 3.75 mM. concentration of the nitrate nitrogen in the nutrient solution for the growing of corn plants at the suboptimal growing conditions, the harvested corn plants increased 26.7% in dry weight and increased 21.0% in organic nitrogen content over similarily grown and processed harvested control plants employing a like nutrient solution except devoid of simazine.

In contrast to these noted significant increases in the harvested corn plant dry weight and organic nitrogen contents, no significant change in dry weight was noted and a decrease in organic nitrogen content was found over non-simazine treated control plants for harvested plants grown under the simulated sub-optimal growing conditions when the nutrient solution contained a 4 mM. concentration of simazine and a 7.5 mM. concentration of the nitrate nitrogen. Upon employing nutrient solutions of a 4 mM. simazine concentration and either of 3.75 mM. or a 7.75 mM. concentration of ammonium nitrogen (supplied as the ammonium ion by using $(NH_4)_2SO_4$) no significant changes in dry weight were noted and decreases in organic nitrogen content were noted for harvested corn plants over non-simazine treated control plants when grown under the simulated suboptimal growing conditions. Upon employing the simulated normal growing conditions and with the nutrient solution containing a 4 mM. concentration of simazine and either a 3.75 mM. or a 7.5 mM. concentration of either the nitrate nitrogen or the ammonium nitrogen, again no significant changes in dry weight were noted and decreases in organic nitrogen content were noted for the resulting harvested corn plants over non-simazine treated control plants.

Corn plants were grown without simazine present and with several different concentrations of simazine present at the suboptimal temperature and a 3.75 mM. nitrate level. Crude enzyme extracts from leaves of these plants were prepared and assayed essentially by the methods of Sanderson and Cocking (Plant Physiology 39: 416–422 (1964)). These enzyme extracts were made by grinding 1.0 g. of fresh leaf tissue in 5.0 ml. of 0.1 M tris buffer, pH 7.5, containing 1.0 mM. cysteine with a previously cooled ($-5°$) mortar and pestle in a cold room (0 to 4°). The homogenates were centrifuged at $10,000 \times g$ for 20 minutes at 0 to 4°. The supernatant solution was assayed for nitrate reductase activity by adding 0.5 ml. of potassium phosphate pH 7.5, 0.1 ml. of 0.1 M $KNO_3$, 0.1 $H_2$, 0.1 ml. of 1.0 mM. NADH, and 0.2 ml. of the enzyme extract and incubating for 20 minutes at 25°. Duplicate samples of each extract were tested, and a zero time treatment for each sample served as the blank. The reaction was stopped by adding 1.0 ml. of 1.0 percent sulfanilamide in 3.0 N HCl. Following this reaction, 1.0 ml. of 0.02 percent N-1 naphthyl-ethylenediamine dihydrochloride was added to form the colored diazo compound and the optical density measured at 540 m$\mu$. Protein determinations were made by the method of Lowry, et. al. (J. Biol. Chem. 193; 265–267 (1951)). The following table one presents these results and illustrates that corn plants, grown at a low night temperature and under low available nitrate in the presence of several different concentrations of simazine, provided harvested plants of increased dry weight and nitrogen content with the nitrogen percentage and dry weight increasing linearly as the simazine concentration is increased up to 0.9 mM.

TABLE ONE

[Dry weight, milligrams nitrogen, and nitrate reductase activity of simazine treated corn plants grown at sub-optimal temperatures and nitrate nitrogen levels]

| | Dry weight (g.) | Nitrogen mg./plant | Nitrate reductase mu-moles $KNO_2$ per mg. protein per 20 min. | |
|---|---|---|---|---|
| | I | I | I | II |
| Simazine ($\mu$M.): | | | | |
| 0.0 | 1.62 | *57.0 a | **2.3 | **3.8 |
| 0.48 | 1.90 | 64.7 b | 8.8 | 6.5 |
| 0.96 | 1.94 | 64.1 b | 21.1 | 7.4 |
| 2.40 | | | | |

*Means with unlike letter significantly different at 1% level.
**F valve for linear increase in nitrate reductase activity with increase in simazine concentration significant at 1% level.

The foregoing data from an article coauthored by the present inventor supports the earlier-presented understanding of how the invention functions metabolically, should susceptible and tolerant plants have a similar metabolic response to treatment by the certain organic chemical agent. In some respects this apparently holds. In each the metabolism of the plant is influenced, although parameters providing various effects on the plants are significantly different as well as the nature and magnitude of the effects created. In contrast to the present invention, which concerns increasing the net protein yield of susceptible crop plants, favorable effects on tolerant plants are only noted in the presence of an extremely limited amount of a nitrate source of a nitrogen plant nutrient and under suboptimal temperatures and growing conditions with the noted increases generally being only a small fraction of those increases obtainable upon treatment of susceptible crop plants. Thus, from a practical viewpoint a significantly greater advance has been provided by the present invention wherein susceptible crop plants are treated.

Although data, therefore, are not presented herein, it should be noted that the particular metabolic effect created by the treatment of the invention is unique in that the suscepible plant's metabolism is influenced favorably to provide harvested plants of increased net protein yield without the nitrogen content of the employed certain organic chemical agents being incorporated into the resulting increased protein content. Thus, the remarkable results provided by the present invention cannot be dismissed on grounds that employed amounts of the agent primarily provide additional nitrogen nutrient for the plant and in this manner accentuate growth.

There now follows illustrative examples of the invention and its practice to describe the invention in detail and to illustrate preferred modes for its practice. In these examples, usual cultural weed control practices were observed. Thus, in those trials carried forth in the field, weeds were controlled by employing herbicides, plastic mulch and/or by hoeing, or mechanical or hand weeding to remove the control and treated plants from influence of weeds on obtained results.

EXAMPLE A

Rye (*Secale cereale*, L.) was planted in cups containing a 3:1 parts by weight mixture of vermiculite/perlite. Except for the content of the certain organic chemical agent therein there was employed the nutrient solution of Tweedy (J. M. Tweedy Ph. D. Thesis 67–1691, Michigan State University, 1966, "The Influence of Simazine on Growth and Nitrogen Metabolism of Plants"). The nutrient solution was replaced every 48 hours to maintain relatively constant agent and nutrient levels. Plants were grown for about one and five weeks before harvesting and determination of their protein content. The following Table 1 includes data for the variously employed agents and their concentration in the nutrient solution along with the protein contents of the harvested plants from the various treatments. The mean reported plant weights are based on composite samples.

Results in Table 1 in general substantiate in providing advantageous increased net protein yields that the effective amount of employed certain agent should not exceed about one-half of the amount phytotoxic to the susceptible crop plant at the time of its treatment. From the tabulated data for treatment of rye with various of the certain organic chemical agents, it will be noted for each of atrazine, terbacil, and prometryne that the employable maximum effective amount thereof falls between 0.05 and 0.5 $\mu$M. concentration with the 0.5 $\mu$M. concentration obviously being at least one-half of the amount phytotoxic to the crop plant during its early growth and development. Likewise, as to the employable minimum effective amount of Fenuron in treating, it can be noted that this minimum apparently falls between an 0.4 and 0.8 $\mu$M. concentration.

TABLE 1

| Herbicide Common name | $\mu$M. conc. | Mean plant weight (g.) Wet | Mean plant weight (g.) Dry | Protein Grams/plant (micro-Kjeldahl) | Protein Percentage in dry plant | Percent increase total protein plant |
|---|---|---|---|---|---|---|
| Grown five weeks: | | | | | | |
| Simazine | 0.0 | 0.954 | 0.115 | 0.0210 | 19.1 | ------ |
|  | 0.2 | 0.902 | 0.120 | 0.0303 | 28.0 | 44.3 |
|  | 0.4 | 0.953 | 0.121 | 0.0302 | 26.3 | 43.8 |
|  | 0.8 | 0.954 | 0.119 | 0.0267 | 23.6 | 27.1 |
| Atrazine | 0.0 | 0.954 | 0.115 | 0.0210 | 19.1 | ------ |
|  | 0.2 | 0.825 | 0.120 | 0.0309 | 30.6 | 47.1 |
|  | 0.4 | 0.622 | 0.117 | 0.0276 | 37.8 | 31.4 |
|  | 0.8 | 0.326 | 0.124 | 0.0154 | 37.6 | (²) |
| Amethryne | 0.0 | 0.954 | 0.115 | 0.0210 | 19.1 | ------ |
|  | 0.05 | 0.902 | 0.125 | 0.0248 | 21.9 | 18.1 |
|  | 0.1 | 0.831 | 0.128 | 0.0288 | 27.1 | 37.1 |
|  | 0.2 | 0.783 | 0.115 | 0.0275 | 24.8 | 31.0 |
| Fenuron | 0.0 | 1.833 | 0.122 | 0.0347 | 15.5 | ------ |
|  | 0.2 | 1.499 | 0.113 | 0.0326 | 18.4 | (²) |
|  | 0.4 | 1.262 | 0.118 | 0.0303 | 20.3 | (²) |
|  | 0.8 | 1.378 | 0.119 | 0.0416 | 25.3 | 19.9 |
| Grown about one week: | | | | | | |
| Simazine | 0.0 | 0.363 | 0.049 | 0.0033 | 6.84 | ------ |
|  | 0.05 | 0.372 | 0.054 | 0.0042 | 7.78 | 37 |
|  | 0.5 | 0.324 | 0.032 | 0.0038 | 10.0 | 15 |
| Atrazine | 0.0 | 0.363 | 0.049 | 0.0033 | 6.84 | ------ |
|  | 0.05 | 0.369 | 0.051 | 0.0040 | 7.85 | 21 |
|  | 0.5 | 0.189 | 0.020 | 0.0020 | 10.0 | (²) |
| Terbacil | 0.0 | 0.363 | 0.049 | 0.0033 | 6.84 | ------ |
|  | 0.05 | 0.362 | 0.052 | 0.0039 | 7.51 | 18 |
|  | 0.5 | 0.172 | 0.021 | 0.0018 | 8.58 | (²) |
| Prometryne | 0.0 | 0.363 | 0.049 | 0.0033 | 6.84 | ------ |
|  | 0.05 | 0.363 | 0.050 | 0.0040 | 8.00 | 21 |
|  | 0.5 | 0.148 | 0.015 | 0.0015 | 10.0 | (²) |

[1] Percentage increase over the control.
[2] None.

A number of organic chemicals, generally recognized as representative of several classes of chemicals known to be useful herbicides, which do not fall within the present invention's definition of those useful and operable certain organic chemical agents of particular triazines, uracils, and phenyl-substituted ureas, also have been evaluated as possible agents for treatment of susceptible crop plants. Although the specific data for these trials are not reported here, almost all treatments by such herbicides failed to increase the total protein content. In the rare instances whereat some increased protein content was noted, the increase was small and not statistically significant. That data substantiates the uniqueness of those useful and operable certain organic chemical agents of the invention in providing advantageous increased total protein content.

EXAMPLE B

Cucumber and lettuce crops and lentil and rice forage were grown in plastic cups containing vermiculite and subjected to simazine treatments. Additionally, treatments of similarly grown rye were made with three other agents, terbacil, atrazine, and diuron. The particularly employed simazine concentrations, nitrogen source levels, and environmental temperatures are noted in the following Tables 2 to 6, which also present the result. The reported enzyme activity and protein determinations were made by established procedures described in their earlier described work of the inventor, noted in the "Plant Physiology" (supra.) paper coauthored by the inventor, and conditions not expressly noted in the various tables otherwise closely approximated those followed in the aforementioned coauthored paper.

TABLE 2
[Effect of simazine on nitrate reductase activity and protein content of cucumber.]

| Simazine conc., $\mu$M.: | Nitrate reductase (mumoles $NO_2$/hr./g. fresh wt.) | Protein* (mg./ml. extract) |
|---|---|---|
| 0 | 31.8 c | 4.30 |
| 0.05 | 60.7 ab | 5.72 |
| 0.25 | 75.0 a | 4.89 |
| 0.5 | 25.5 c | 1.76 |

\* F value for quadratic effect of simazine significant at 5% level.
Note.—Means with unlike letters are significantly different at 5% level.

TABLE 3
[Effect of simazine on nitrate reductase activity and protein content of cucumber.]

| Simazine conc., $\mu$M.: | Nitrate reductase (mumoles $NO^2$/hr./ml. extract) | Protein (mg./ml. extract) |
|---|---|---|
| 0.05 | 16.0 d | 1.07 c |
| 0.05 | 17.5 dc | 1.59 c |
| 0.25 | 40.1 a | 7.81 a |
| 0.5 | 31.9 b | 4.91 b |
| 1.25 | 24.4 c | .54 c |

Note.—Means with unlike letters are significantly different at 5% level.

From the results reported in Tables 2 and 3, it can be noted for cucumber and lettuce, respectively, treated with simazine as the certain organic chemical agent that the employable maximum effective amount of simazine be between 0.25 and 0.5 $\mu$M. for cucumber and between 0.5 and 1.25 $\mu$M. for lettuce with the 0.5 $\mu$M. concentration for cucumber and the 1.25 $\mu$M. concentration for lettuce being in excess of one-half the phytotoxic amount of simazine to the particular crop plant during some portion of its growth prior to harvest.

TABLE 4.—EFFECT OF SIMAZINE ON THE PROTEIN CONTENT OF LENTIL FORAGE

*Lens esculentum*, L., MSU Cowboy:
Planted, March 28
Treated, March 28
Harvested, April 25

| | Weight per plant [1] | | Water extractable | |
|---|---|---|---|---|
| | Fresh wt. (mg.) | Dry wt. (mg.) | (mg.) | Fresh wt. (percent inc.) |
| Simazine treatment, $\mu$M.: | | | | |
| 0 | 522 a | 75.7 a | 6.6 a | 30 |
| 0.1 | 440 a | 65.3 ab | 8.6 ac | |
| 0.2 | 435 a | 54.3 b | 10.3 bc | 56 |
| 0.4 | 303 b | 32.0 c | 12.6 b | 91 |

[1] Means followed by unlike letters are significant at the 5% level.

TABLE 5.—EFFECT OF SIMAZINE ON THE PROTEIN CONTENT OF RICE FORAGE

*Oryza sativa*, L.:
Planted, February 28
Treated, March 18, and every week thereafter to harvest;
Harvested, April 10

| | Water extractable protein | |
|---|---|---|
| | (Mg./g. fresh wt.) | Inc. (percent) |
| Simazine treatment, $\mu$M.: | | |
| 0 | [1] 16.5 | |
| 0.1 | 22.6 | 36 |
| 0.2 | 22.5 | 36 |
| 0.4 | 27.9 | 69 |

[1] F value for linear effect is significant at the 5% level.

TABLE 6.—EFFECT OF THREE HERBICIEDS ON NITRATE REDUCTASE ACTIVITY AND PROTEIN CONTENT OF RYE

| Treatment | | Amount/gram fresh wt. | |
|---|---|---|---|
| Chemical | $\mu$M. | Nitrate reductase (mumoles $KNO_2$/hr.) | Protein (mg.) |
| Control | 0 | 11 | 6.4 |
| Terbacil | .05 | 6 | 6.7 |
| | .10 | 7 | 7.0 |
| | .20 | 70 | 7.7 |
| | .40 | 128 | 8.3 |
| Atrazine | .05 | 7 | 6.7 |
| | .10 | 8 | 6.9 |
| | .20 | 9 | 7.3 |
| | .40 | 98 | 8.3 |
| Duiron | .05 | 7 | 6.1 |
| | .10 | 8 | 6.5 |
| | .20 | 142 | 7.3 |
| | .40 | 202 | 7.5 |

EXAMPLE C

Rye (*Secale cereale*, L., cv. MSU Expt. 1) and peas (*Pisum sativum*, L., cv. Little Marvel) were seeded in plastic cups containing vermiculite. Nutrient solutions were prepared according to Hoagland and Arnon (supra.). Nitrogen was supplied as $KNO_3$ for the nitrate studies, and $(NH_4)_2SO_4$ for the ammonium studies. The pH of the $NH_4+$ nutrient solution was adjusted with KOH to that of the $NO_3-$ nutrient solution (pH 6.5). There was no appreciable change in the pH of the growing media during the course of the experiments.

Plants were grown at 22° for 16 hours with 2,000 ft.-c. of light and at 17° for an 8-hour night. Low-temperature studies were conducted at a 17° day and a 12° night temperature. Simazine treatments were made by adding aliquots from a 25.0-$\mu$M. stock solution to the nutrient solution and applying it at regular intervals commencing approximately one week after seeding. Approximately 750 and 600 ml. of treating solution were applied at the high and low temperatures, respectively, over the duration of the experiments.

Plants were harvested, the aerial portion cut into approximately 5-mm. segments, weighed, and 1-gm. samples held in ice for subsequent assay of nitrate reductase and protein content. Another 1-gm. sample was used for determining dry weight and total Kjeldahl N. A crude enzyme extract was prepared and assayed for nitrate reductase by the method of Sanderson and Cocking (supra.)

Protein determinations were made by the method of Lowry, et al. (supra.) and by a micro-Kjeldahl procedure. Respiration rate of intact plants was determined on two successive nights by measuring $O_2$ uptake and $CO_2$ evolution in an automatic gas analyzing system.

All treatments were replicated two or three times and arranged in a completely randomized design within the growth chambers. The data were subjected to analysis of variance and the means compared by the F test or Duncan's multiple range procedure. All data with the exception of the respiration measurements are expressed as amounts per plant, which best illustrates the changes in absolute amounts of protein.

The following Tables 7 to 14 present results of this example with each table containing information as to the particularly employed simazine and nitrate nitrogen concentration for the data presented therein as well as the protein content of the particular harvested crop and other useful information.

TABLE 7.—EFFECT OF SIMAZINE CONCENTRATION ON GROWTH AND PROTEIN CONTENT OF 26-DAY-OLD RYE RECEIVING 6mM $NO_3$– N IN THE NUTRIENT SOLUTION

| | Amount per plant | | | Protein increase [1] | |
|---|---|---|---|---|---|
| | Fresh wt. (mg.) | Dry wt. (mg.) | Protein (mg.) | Per plant (percent) | Per dry wt. (percent) |
| Simazine Conc. ($\mu$M.): | | | | | |
| 0.00 | 361 | 77 | [2] 2.9 | | |
| 0.05 | 367 | 77 | 3.2 | 10 | 10 |
| 0.10 | 373 | 71 | 4.2 | 45 | 57 |
| 0.20 | 350 | 57 | 3.6 | 24 | 68 |
| 0.40 | 374 | 59 | 3.8 | 31 | 71 |
| 0.80 | 344 | 42 | 3.8 | 31 | 140 |

[1] Expressed as percentage increase over the control.
[2] Control significantly lower than simazine treatments at 5% level.

TABLE 8.—RESPONSE OF 25-DAY-OLD RYE TO SIMAZINE TREATMENT AT VARIOUS LEVELS OF $NO_3$– NITROGEN

| Treatment | | Amount per plant | | | | Protein increase [1] | |
|---|---|---|---|---|---|---|---|
| N level (mM.) | Simazine conc. ($\mu$M.) | Fresh wt. (mg.) | Dry wt. (mg.) | Nitrate reductase [2] (m$\mu$moles $NO_2$/hr.) | Protein [1] (mg.) | Per plant (percent) | Per dry wt. (percent) |
| 3 | 0.0 | 302 | 43 | 66 | 4.26 | | |
| 3 | 0.4 | 344 | 43 | 408 | 5.94 | 39 | 39 |
| 6 | 0.0 | 398 | 54 | 386 | 7.23 | | |
| 6 | 0.4 | 387 | 46 | 840 | 8.83 | 22 | 43 |
| 12 | 0.0 | 525 | 68 | 1,305 | 11.17 | | |
| 12 | 0.4 | 553 | 65 | 1,876 | 13.65 | 22 | 28 |

[1] Expressed as percentage increase over the control.
[2] F value for comparison of control versus treatment, within nitrogen levels, significantly different at 1% level.

TABLE 9.—EFFECT OF SIMAZINE ON THE RESPIRATION RATE OF 21-DAY-OLD RYE PLANTS GROWN ON $NO_3$–NITROGEN

| | Average cumulative respiration for two 12-hr. periods | | | | |
|---|---|---|---|---|---|
| | Ml./100 gm. fresh wt. | | Ml./10 gm. dry wt. | | Respiratory quotient |
| | $CO_2$ | $O_2$ | $CO_2$ | $O_2$ | |
| Simazine conc. ($\mu$M.): | | | | | |
| 0.0 | 332 | *356 | *316 | *339 | 0.93 |
| 0.2 | 364 | 384 | 372 | 392 | 0.94 |
| 0.4 | 363 | 386 | 361 | 384 | 0.94 |
| 0.8 | 342 | 362 | 386 | 410 | 0.94 |

*Control is significantly lower than threatments at 5% level.

TABLE 10.—RESPONSE TO SIMAZINE OF RYE PLANTS GROWN FOR 33 DAYS AT DIFFERENT TEMPERATURES

| Treatment | | Amount per plant [1] | | | | Protein increase [2] | |
|---|---|---|---|---|---|---|---|
| Temp. (°C.) | Simazine conc. ($\mu$M.) | Fresh wt. (mg.) | Dry wt. (mg.) | Nitrate reductase (m$\mu$moles) $KNO_2$/hr.) | Protein (mg.) | Per plant (percent) | Per dry wt. (percent) |
| 17-12 | 0.0 | 325 a | 76 a | 31 a | 3.18 a | | |
| 17-12 | 0.2 | 319 a | 60 a | 99 b | 4.59 b | 44 | 83 |
| 17-12 | 0.4 | 328 a | 64 a | 192 c | 5.05 c | 59 | 89 |
| 22-17 | 0.0 | 380 a | 59 a | 73 a | 4.36 a | | |
| 22-17 | 0.2 | 456 b | 67 a | 266 b | 5.98 ab | 37 | 21 |
| 22-17 | 0.4 | 463 b | 68 a | 603 c | 7.82 c | 79 | 56 |

[1] Means followed by unlike letters are significantly different at the 5% level within a temperature.
[2] Expressed as percentage increase over the control.

TABLE 11.—EFFECT OF LIGHT INTENSITY ON THE NITRATE REDUCTASE ACTIVITY AND PROTEIN CONTENT OF 34-DAY-OLD RYE PLANTS RECEIVING SIMAZINE AT LOW TEMPERATURES (17-12°) AND 3mM.$NO_3$–

| Treatment | | Amount per plant | | | | Protein increase [1] | |
|---|---|---|---|---|---|---|---|
| Light intensity (ft.-c.) | Simazine conc. ($\mu$M.) | Fresh wt. (mg.) | Dry wt. (mg.) | Nitrate reductase (m$\mu$moles $KNO_2$/hr.) | Protein [2] (mg.) | Per plant (percent) | Per dry wt. (percent) |
| 2,000 | 0.0 | 570 | 136 | 12 | 4.1 | | |
| 2,000 | 0.2 | 610 | 124 | 36 | 5.2 | 27 | 40 |
| 2,000 | 0.4 | 506 | 85 | 60 | 4.6 | 12 | 80 |
| 1,200 | 0.0 | 654 | 134 | 18 | 4.7 | | |
| 1,200 | 0.2 | 688 | 130 | 41 | 5.5 | 17 | 20 |
| 1,200 | 0.4 | 518 | 82 | 100 | 4.8 | 2 | 69 |
| 150 | 0.0 | 487 | 49 | 472 | 3.8 | | |
| 150 | 0.2 | 472 | 46 | 474 | 3.7 | 0 | 3 |
| 150 | 0.4 | 416 | 40 | 443 | 3.3 | 0 | 5 |

[1] Expressed as percentage increase over the control.
[2] F-value for comparison of average protein content of 0.2$\mu$M. simazine at 2,000 and 1,200 ft.-c. with control and 0.4 $\mu$M. simazine significant at 5% level.

TABLE 12.—INFLUENCE OF SIMAZINE ON GROWTH AND PROTEIN CONTENT OF MATURE PEA SEEDS [2]

| | Dry wt. | | Seed protein [2] | | | | | | | |
|---|---|---|---|---|---|---|---|---|---|---|
| | | | Water-extractable | | | | | | Total | |
| | | | Lowry | | | Kjeldahl | | | | |
| | | | | Protein increase | | | Protein increase | | | Protein increase |
| | Per plant (gm.) | Seeds Per plant (gm.) | Protein per plant (mg.) | Per plant (percent) | Per dry wt. (percent) | Protein per plant (mg.) | Per plant (percent) | Per dry wt. (percent) | Protein per plant (mg.) | Per plant (percent) | Per dry wt. (percent) |
| Simazine conc. ($\mu$M.): | | | | | | | | | | | |
| 0.00 | 1.36 a | 0.88 a | 83 a | | | 94 c | | | 156 b | | |
| 0.05 | 1.26 a | 1.03 a | 117 b | 41 | 21 | 147 a | 56 | 34 | 219 a | 40 | 20 |
| 0.15 | 1.21 a | 0.82 a | 103 ab | 24 | 34 | 122 b | 30 | 39 | 200 a | 28 | 38 |
| 0.30 | 0.95 b | 0.58 b | 89 a | 7 | 63 | 107 bc | 14 | 72 | 150 b | 0 | 46 |

[1] Means followed by unlike letters are significantly different at the 5% level.
[2] Mature seeds were extracted as stated in Materials and Methods. Proteins were precipitated with TCA and aliquots taken for Lowry and Kjeldahl determinations. Total N in seed determined by Kjeldahl and converted to protein by factor 6.25.

The data of this example provides the following results, which for ready understanding are discussed under various subheadings below:

Simazine concentration.—Rye plants receiving 0.5–0.8 $\mu$M. simazine contained up to 45 percent more water-extractable protein per plant than the controls. The dependence on simazine concentration was between 0 and 0.1 $\mu$M., but not above 0.1 $\mu$M. The fresh weight per plant was not changed, but there was a progressive decrease in percent dry weight with increasing simazine concentration.

Nitrate level and temperature.—Protein content and nitrate reductase activity per plant increased with increasing levels of $NO_3-$ nitrogen in the nutrient solution. Regardless of nitrogen level, there was a concomitant increase in both nitrate reductase activity and water-extractable protein per plant from simazine applications. Enzyme activity increased substantially more than protein content from simazine applications at all $NO_3-$ levels. However, the relative increase from simazine applications decreased with increasing $NO_3-$ levels.

Simazine applications to rye plants grown under two different temperature regimes increased protein content and nitrate reductase activity at both temperatures. The enzyme activity more than doubled with a 5° increase in temperature, with or without simazine. The increase in protein content caused by 0.4 $\mu$M. simazine was 79 and 59 percent at the high and low temperatures, respectively. It can be noted from the data in Table 10, that a larger protein yield is provided by the simazine treatment at the suboptimal growing temperature than is obtained at the higher growing temperatures where no simazine treatment was made.

Light intensity.—Rye plants grown under three different light intensities responded to simazine applications at both 1,200 and 2,000 ft.-c., but not at 150 ft.-c. Nitrate reductase activity was highest in the etiolated plants grown at 150 ft.-c., but there was no response to simazine.

Seed protein.—Pea plants treated with simazine and grown to maturity contained more seed protein. Simazine levels as low as 0.05 $\mu$M. resulted in more than a 40 percent increase in water-extractable protein and total N per plant. At higher levels (0.30 $\mu$M. of simazine) plant growth was inhibited and although there was 63 percent more protein per gram dry weight, there was less total protein per plant. These data illustrate that the increased protein synthesis from simazine applications observed in young plants may also be manifested in the maturing seed, the major storage organ for protein in many susceptible plant species.

Protein profile.—Acrylamide gel electrophoresis of proteins extracted from rye plants and pea seeds indicated no upset and obvious alteration in the protein pattern from the simazine treatments. Instead, generally more of the same types of proteins were synthesized as will be apparent from data therefore in Table 13. The protein profile of the crude enzyme etracts was obtained by acrylamide gel electrophoresis (Ann. N.Y. Acad. Sci. 121: 404 (1964)).

TABLE 13.—AMINO ACIDS ANALYSIS OF SIMAZINE TREATED OATS AND PEAS

| | Distribution*, g./16g. N, treatment $\mu$M.) | | | | |
|---|---|---|---|---|---|
| | Oats | | Peas | | |
| Amino acid | 0 | 0.025 +0.10 | 0 | 0.15 | 0.8 |
| Alanine | 4.38 | 4.35 | 6.38 | 6.23 | 5.46 |
| Arginine | 6.91 | 7.24 | 15.70 | 14.92 | 16.33 |
| Aspartic acid | 7.74 | 7.36 | 10.37 | 10.50 | 10.41 |
| Cystine | 1.70 | 1.63 | 0.41 | 0.41 | 0.36 |
| Glutamic acid | 22.87 | 21.59 | 16.02 | 16.31 | 16.57 |
| Glycine | 4.51 | 4.77 | 3.78 | 3.84 | 3.88 |
| Histidine | 2.14 | 2.20 | 2.06 | 2.01 | 2.15 |
| Isoleucine | 3.43 | 3.41 | 3.89 | 3.94 | 3.75 |
| Leucine | 7.12 | 7.18 | 6.88 | 7.87 | 7.03 |
| Lysine | 3.72 | 3.76 | 7.01 | 6.98 | 6.75 |
| Methionine | 1.12 | 1.25 | 0.40 | 0.28 | 0.22 |
| Phenylalanine | 4.83 | 4.83 | 4.25 | 4.43 | 4.23 |
| Proline | 5.05 | 4.98 | 5.27 | 4.73 | 4.78 |
| Serine | 4.81 | 4.77 | 4.36 | 4.34 | 4.33 |
| Threonine | 3.21 | 3.23 | 4.04 | 4.01 | 4.04 |
| Tryptophan | 0.99 | 1.08 | 0.77 | 0.70 | 0.68 |
| Tyrosine | 2.64 | 2.81 | 2.87 | 2.88 | 2.66 |
| Valine | 1.17 | 4.55 | 4.62 | 4.57 | 4.44 |
| Total nitrogen | 2.80 | 2.90 | 4.27 | 4.54 | 4.74 |

*Distribution refers to the grams of amino acid per 100 grams of protein in the sample. (Protein equals percent N$\times$6.25.)

Dependence on $NO_3-$ as nitrogen source.—Rye was grown as earlier described in this example except for replacement of the nitrate ion nitrogen source by an ammonium ion nitrogen source. Where $NH_4+$ was substituted for $NO_3-$ as a source of nitrogen, 2-chloro-6-trichloromethyl pyridine was used to prevent oxidation of $NH_4+$ by Nitrosomonas sp. This compound was applied in all treatments at the rate of 10 percent of the respective N level. The following Table 14 presents results obtained. The results substantiate that rye plants treated with simazine contained significantly more protein and had a higher level of nitrate reductase activity when grown with $NO_3-$, but not when grown with $NH_4+$, as the nitrogen source.

TABLE 14.—INCREASE IN NITRATE REDUCTASE ACTIVITY AND PROTEIN CONTENT OF SIMAZINE-TREATED RYE WITH $NO_3-$ COMPARED TO $NH_4+$ AS A SOURCE OF NITROGEN

| Treatment | | Amount per plant | | | | |
|---|---|---|---|---|---|---|
| N source (6 mm.) | Simazine conc. ($\mu$M.) | Fresh wt. (mg.) | Dry wt. (mg.) | Dry wt. (percent) | Nitrate reductase (m$\mu$moles, $KNO_2$/hr.) | Protein (mg.) |
| $NO_3-$ | 0.0 | 363 a | 82 a | 22 | 54 a | 2.24 a |
| $NO_3-$ | 0.4 | 331 a | 56 b | 16 | 400 b | 2.88 b |
| $NH_4+$ | 0.0 | 317 a | 76 a | 23 | 73 a | 2.76 b |
| $NH_4+$ | 0.4 | 321 a | 77 a | 23 | 54 a | 2.60 b |

NOTE.—Means followed by unlike letters are significantly different at 5% level.

EXAMPLE D

Field trials of the invention were made near San Jose, Costa Rica, at the El Alto Experiment Station (Elev. 1,490 M.) of the Ministry of Agriculture, and the Experiment Station of the University of Costa Rica (Elev. 843 M.). Concurrently, trials were conducted at East Lansing and Fremont, Mich.

Ryegrass (*Lolium perenne*, L.) and edible dry beans (*Phaseolus vulgaris*, L.) were planted both at El Alto and the University of Costa Rica Experiment Stations, and rice (*Oryza sativa*, L.) was seeded at the Experiment Station. Canning peas were treated in a commercial field near Fremont, Mich. Established plantings of alfalfa (*Medicago sativa*, L.) and oats (*Avena sativa*, L.) were treated on a farm near East Lansing. The usual cultural practices for each area including herbicides, fertilizer and pesticide applications were followed. The location, cultivar and cultural information and other information for each crop are presented in Tables 18 to 23 which follow shortly in this example.

In Michigan, the plots (10 sq. m.) were arranged in randomized blocks with the exception of the oat plots which were 30 sq. m., and subdivided for three types of application. In Costa Rica a right angle confounded design was employed with sprays applied on plots (6 sq. m.) perpendicular to the one m. wide rows of corps. Three replicates were employed in Michigan and two in Costa Rica.

An 80 percent wettable powder of simazine was applied in all cases with a small plot sprayer designed to accurately apply the chemical in about 30 gal./a. of water.

All protein determinations were made in East Lansing. The water-extractable protein determinations were made of the forage crops harvested in Michigan and of the seed crops harvested from both Michigan and Costa Rica by the Lowry, et. al. (1951) (supra.), method of protein analysis. It was not possible to keep ryegrass and rice samples from Costa Rica in a condition necessary for accurate Lowry determinations. The AOAC micro-Kjeldahl procedure (Official Methods of Analysis of the Association of Official Agricultural Chemists, Published by Association of Official Agricultural Chemists, Washington, D.C., 10th Edition, pp. 744–745 (1965)) was used to determine the total N in each sample and a factor of 6.25 was used to convert this to total protein except in the case of peas where a factor of 5.7 was used. It is to be understood that analyses of total nitrogen as determined by micro-Kjeldahl procedures must necessarily account for nitrogen that is not protein, particularly in the case of forage crops. However, this data accompanied with determinations of trichloroacetic acid precipitable protein seems to be a conservative estimate of the relative protein increased in the crops. Samples of the seed and forage harvested from each plot were selected at random and cut into 5 mm. sections. One g. was dried for micro-Kjeldahl determinations. Another 5 g. sample of this composite was macerated in an electric mortar and pestle in 25 ml. of a phosphate buffer, pH 7.5 and an aliquot taken for water extractable protein determinations. Nitrate determinations were made on the dried samples using the method of Lowe and Hamilton, (J. Agr. Food Chem., 15: 359–361 (1967)).

The reported data were subjected to analysis of variance and the means compared by the F test or Duncan's multiple range procedure. The percent increase in protein per acre was only calculated if the F value for treatment yields proved significant.

TABLE 15.—INFLUENCE OF SIMAZINE ON GROWTH AND PROTEIN CONTENT OF RYEGRASS [1] FORAGE IN MICHIGAN AND COSTA RICA

| | | | Protein content [2] | | |
|---|---|---|---|---|---|
| Simazine treatment (lb./a.) | Fresh wt. (tons/a.) | Nitrate level [2] (p.p.m.) | Total (mg./g. dry wt.) | Increase per dry wt. (percent) | Increase per acre (percent) |
| East Lansing, Michigan: [3] | | | | | |
| 0 | [4] 8.7 | 395 a | 113 a | | |
| 1/16 | 12.9 | 352 a | 122 a | 8 | 49 |
| 1/8 | 10.5 | 464 a | 141 ab | 25 | 33 |
| 1/4 | 9.4 | 4,107 b | 190 b | 68 | 52 |
| El Alto, Costa Rica: [5] | | | | | |
| 0 | 3.6 | 348 a | 115 a | | |
| 1/8 | 4.4 | 258 a | 105 a | 0 | |
| 1/4 | 4.0 | 736 a | 133 b | 16 | |
| 1/2 | 4.6 | 2,984 b | 160 c | 39 | |

[1] Cultivar, MSU experimental allotetraploid.
[2] Means followed by unlike letters are significant at the 5% level.
[3] Planting, Fall of previous year; treatment, April 5; harvest, June 1.
[4] F value for quadratic increase in yield significant at 5% level.
[5] Planting, April 4; treatment, April 5; harvest, July 7.

NOTE.—An excellent crop of ryegrass for forage was produced both in Michigan at an 0.33 m. spacing and at the El Alto station in Costa Rica where the rows were 1 m. apart. At the much warmer University of Costa Rica Experiment Station in Costa Rica, the crop was lost due to the adverse environment.

TABLE 16.—PROTEIN CONTENT YIELD AND NITRATE LEVEL PER PLANT OF CANNING PEAS [1] GROWN AT FREMONT, MICHIGAN [2]

| | Seed dry weight | | | Seed protein | | | | | |
|---|---|---|---|---|---|---|---|---|---|
| | | | Nitrate level (p.p.m.) | Water extractable | | Total | | Difference from control | |
| | Mg. | Percent inc. | | Mg. | Percent inc. | Mg. | Percent inc. | Water (mg.) | Total (mg.) |
| Simazine treatment (lb./a.): | | | | | | | | | |
| 0 | [3] 656 | | 107 | [4] 74 a | | [5] 154 | | | |
| 1/16 | 730 | 11 | 104 | 92 ac | 24 | 176 | 14 | 16 | 22 |
| 1/8 | 760 | 16 | 103 | 98 ab | 32 | 183 | 19 | 22 | 29 |
| 3/16 | 914 | 39 | 110 | 127 b | 72 | 217 | 41 | 51 | 63 |
| 1/4 | 794 | 21 | 107 | 119 b | 61 | 194 | 26 | 42 | 40 |
| 1/2 | 792 | 21 | 92 | 112 bc | 51 | 197 | 28 | 36 | 43 |
| 1 | 652 | 0 | 111 | 88 | 16 | 169 | 10 | 12 | 12 |

[1] Cultivar, Freezer 69.
[2] Planted, May 1; treatment, May 4; harvest, June 25.
[3] F value for linear increase in yield significant at 5% level.
[4] Means followed by unlike letters are significant at 5% level.
[5] F value for quadratic effect significant at 5% level.
[6] This application amount of simazine to canning peas closely approximates or exceeds the maximum employable amount. This is apparent from the results therefrom as illustarted by a significant decrease in protein increases in comparison to employing smaller amounts.

TABLE 17.—EFFECT OF SIAMAZINE ON PROTEIN AND NITRATE CONTENT AND YIELD OF ALFALFA [1] GROWN AT EAST LANSING, MICHIGAN [2]

| | | | Protein content (mg./g. dry wt) [3] | | | | | |
|---|---|---|---|---|---|---|---|---|
| | Yield (dry wt.), tons/a.) | Nitrate level (p.p.m.) | Water extractable | | Total | | Difference from control | |
| | | | Mg. | Inc., percent | Mg. | Inc., percent | Water (mg.) | Total (mg.) |
| Simazine treatment (ab./a.): | | | | | | | | |
| 0 | 1.83 | 1,420 | 72 a | | 209 a | | | |
| 1/16 | 2.09 | 590 | 78 ab | 4 | 214 ab | 3 | 4 | 5 |
| 1/8 | 1.61 | 710 | 83ab | 15 | 219 b | 5 | 11 | 10 |
| 1/4 | 1.89 | 1,608 | 91 b | 26 | 226 c | 8 | 19 | 17 |
| 1/2 | 1.73 | 817 | 92 b | 28 | 231 c | 10 | 20 | 22 |

[1] Cultivar, Vernal.
[2] Planting, about six years earlier; treatment, April 27; harvest, June 27.
[3] Means followed by unlike letters are significant at 5% level.

TABLE 18.—THE YIELD AND PROTEIN CONTENT OF EDIBLE DRY BEANS [1] GROWN IN COSTA RICA

| | | Seed protein (mg./g. dry wt.) [2] | | | |
|---|---|---|---|---|---|
| | | | | Increase per acre | |
| Simazine treatment (lb./a.) | Yield (lb./a.) | Water extractable (mg.) | Total (mg.) | Water extractable (percent) | Total (percent) |
| El Alto, Costa Rica [3]: | | | | | |
| 0 | [4] 2,799 | 135 | 189 | | |
| 1/8 | 3,291 | 138 | 197 | 23 | 20 |
| 1/4 | 3,215 | 135 | 197 | 20 | 15 |
| 1/2 | 3,888 | 141 | 200 | 47 | 45 |
| Experiment Station, Costa Rica [5]: | | | | | |
| 0 | 951 | 180 | 214 a | | |
| 1/8 | 1,039 | 195 | 242 b | 18 | 24 |
| 1/4 | 907 | 199 | 239 b | 4 | 6 |
| 1/2 | 890 | 187 | 243 b | | 5 |

[1] Cultivar, San Fernando.
[2] Means followed by unlike letters are significant at 5% level.
[3] Planted, April 4; treatment, April 5; harvest, July 7.
[4] F value for linear effect significant at 5% level.
[5] Planted, April 5; treatment, April 5; harvest, July 7.

TABLE 19.—THE PROTEIN CONTENT OF DRY LAND RICE [1] FOLIAGE [2] IN COSTA RICA [3]

| | Total leaf protein [4] | |
|---|---|---|
| | Mg./g. dry wt. (mg.) | Increase (percent) |
| Simazine treatment (lb./a.): | | |
| 0 | [4] 138 a | |
| 1/16 | 140 a | 1 |
| 1/8 | 184 b | 33 |
| 1/4 | 182 b | 32 |
| 1/2 | 180 b | 30 |

[1] Cultivar, Surinam 245.
[2] Yield records of the rice were not obtained because of bird damage. The remaining plants were harvested for protein determination on foliage.
[3] Planted, April 5; treatment, April 5; harvest, July 7.
[4] Means followed by unlike letters are significant at the 5% level.

TABLE 20.—AVERAGE YIELD AND PROTEIN CONTENT OF OAT [1] GROATS [2] RECEIVING SIMAZINE AT EITHER OR BOTH EMERGENCE AND FLOWERING [3] [4]

| | | Protein | | | |
|---|---|---|---|---|---|
| | | Water extractable [5] | | Total [5] | |
| | Yield, bu./a. | Mg./g. dry wt. | Percent inc. | Mg./g. dry wt. | Percent inc. |
| Simazine treatment (lb./a.): | | | | | |
| 0 | 34.1 | 39.7 a | | 155 a | |
| 1/16 | 27.1 | 43.9 ab | 11 | 166 ab | 7 |
| 1/8 | 31.7 | 47.3 b | 19 | 174 b | 12 |
| 1/4 | 33.0 | 42.4 ab | 7 | 161 ab | 4 |

[1] Cultivar, Rodney.
[2] The most effective method for determining protein content of oats was to manually remove the oat hull and to analyze the groat. Difficulty was encountered in obtaining a homogeneous sample when the unhulled seeds were ground.
[3] F value for interaction of rate of application × time of application not significant at 5% level. Each value is mean of 9 applications.
[4] Planted, April 17; treatment, at emergence, May 5, or at flowering, June 23, or at both times; harvested, July 8.
[5] Means followed by unlike letters are significant at the 5% level.

NOTE.—Oats receiving simazine at emergence, flowering or at both times responded similarly. Although treatments applied at flowering appeared most effective there was no statistically significant difference between time of application or for the interaction between time of application or for the interaction between time and rate of application for yield or protein content. Accordingly, the reported data is the combined data of all treatments.

The foregoing tabulated data of this example clearly shows that, field applications of simazine under the vastly different environmental conditions of Michigan and Costa Rica caused similar responses. The field results substantiate that low-level, non-phytotoxic applications of less than ½ lb./a. of simazine will appreciably increase the protein content and/or yield of food and forage crops grown under the tropical environmental conditions of Costa Rica and the temperate conditions of Michigan. Both the yield and protein content were increased in ryegrass forage, pea and bean seed; and the protein content was increased in bean seed, rice foliage, alfalfa forage and oats.

Maximal increases of total crude protein per acre for the different crops at rates less than ½ lb./a. were: ryegrass—52%; pea seed (assuming a uniform stand)—41%; alfalfa forage—10%; bean seed—45%; rice foliage—33%; and oat groats—12%.

The simazine treatment increased both the yield and crude protein content on a dry weight basis for ryegrass at both locations. The increased yield of protein on a per acre basis ranged from 33 to 52 percent.

Canning peas grown at Fremont, Mich., and treated 3 days after planting with 3/16 lb./a. of simazine yielded 72 percent more water-extractable seed protein and 42 percent more total seed protein per plant. The difference between the treatments and control in the two methods of analysis provided an interesting comparison indicating that in this instance the increase in protein content is in the water-extractable protein fraction. The nitrate content of the pea seed was not altered by treatment.

Simazine applications to an established alfalfa stand at East Lansing did not alter the yield of the first cutting, but they did increase the protein content, particularly the water-extractable fraction. The nitrate levels of the forage were not altered appreciably by simazine treatment indicating this forage would be satisfactory for animal consumption.

The growth of edible dry beans at the El Alto plots was superior to that obtained at the Experiment Station and ¼ lb./a. of simazine increased the yield appreciably at the former location without altering the protein content of the seed. At the Experiment Station, there was a greater effect on the protein content of the seed than there was on the yield.

Regardless of time of application ⅛ lb./a. of simazine increased both the water-extractable and total protein content of oat groats by more than 10 percent without reducing the yield.

EXAMPLE E

Field trials of the invention were made at East Lansing, Michigan, employing simazine. At this location there were planted and treated with simazine: rye (*Secale cereale*, L.); alfalfa (*Medicago sativa*, L.); snapbean (*Phaseolus vulgaris*, L.); and soybean (*Glycine Max*, Merr.). A field trial also was made at Stuttgart, Arkansas, wherein paddy rice seed (*Oryza sativa*, L.) was planted and treated with simazine. The simazine was applied as an 80 percent wettable powder in about 30 gal./a. of water with a small plot sprayer designed to accurately apply the same. The usual cultural practices for the area were followed except for the employed simazine treatment. Nitrate, protein, and other analyses were made in the manner described in the earlier examples, and unless stated otherwise all portions of the field trials of this example were substantially the same as followed in the earlier presented examples. Cultural and other information for these field trials along with results thereof are presented in the following Tables 21 through 25.

TABLE 21.—EFFECT OF SIMAZINE ON THE PROTEIN CONTENT AND YIELD OF RYE FORAGE

*Secale cereale*, L. Var. MSU No. 1:
    Location, East Lansing, Michigan
    Planted, fall of previous year
    Treated, April 1
    Chemical, simazine, 80% WP
    Harvested, May 18

| | | | | | Protein (mg./g. dry wt.)[1] | | | |
|---|---|---|---|---|---|---|---|---|
| | | | | | Water extractable | | Total | |
| | Yield (tons/a.) | Dry wt., percent | NH$_3$ (μg./g. dry wt.) | Nitrate (μg./g. dry wt.) | Mg. | Percent inc. | Mg. | Percent inc. |
| Treatment (lb./a.): | | | | | | | | |
| 0 | [2] 12.9 | 19.1 | 1,539 | 609 | 32.7 a | | 135 a | |
| 1/16 | 13.9 | 18.9 | 1,877 | 1,252 | 37.2 a | 12 | 151 b | 12 |
| 1/8 | 13.5 | 19.4 | 1,563 | 361 | 35.0 a | 6 | 130 a | |
| 1/4 | 13.1 | 19.3 | 1,553 | 682 | 37.1 a | 13 | 128 a | |
| 1/2 | 12.4 | 19.5 | 1,509 | 1,480 | 38.8 a | 18 | 149 b | 10 |
| 1 | 8.5 | 18.3 | 1,607 | 1,807 | 49.8 b | 51 | 192 c | 42 |

[1] Means followed by unlike letters are significant at 5% level.
[2] Means F value for quadratic increase in yield is significant at 5% level.

TABLE 22.—EFFECT OF SIMAZINE ON THE PROTEIN CONTENT AND YIELD OF ALFALFA FORAGE

*Medicago sativa*, L. var vernal:
    Location, East Lansing, Michigan
    Planted, eight years earlier
    Chemical, simazine, 80% WP
    Treatment, April 27
    Harvested, June 27

| | | | | Protein (mg./g. dry wt.)[1] | | | | | |
|---|---|---|---|---|---|---|---|---|---|
| | | | | Water extractable | | | Total | | |
| | Yield fresh wt. (tons/a.) | Yield dry wt. (tons/a.) | Nitrate level (μg./g.) | Mg. | Percent | Difference from control | Mg. | Percent | Difference from control |
| Treatment (lb./a.): | | | | | | | | | |
| 0 | 7.64 | 1.83 | 1,420 | 72 a | | | 209 a | | |
| 1/16 | 8.32 | 2.09 | 590 | 78 ab | 8 | 4 | 214 ab | 3 | 5 |
| 1/8 | 6.49 | 1.61 | 710 | 83 ab | 15 | 11 | 219 b | 5 | 10 |
| 1/4 | 7.95 | 1.89 | 1,608 | 91 b | 26 | 19 | 226 c | 8 | 17 |
| 1/2 | 7.08 | 1.73 | 817 | 92 b | 28 | 20 | 231 c | 10 | 22 |

TABLE 23.—EFFECT OF DIFFERENT TIMES OF SIMAZINE APPLICATION ON THE PROTEIN CONTENT OF SNAPBEAN

*Phaseolus vulgaris*, L. var. W. S. Greenpod 60209:
    Location, East Lansing, Michigan
    Planting, July 3
    Harvest, September 6
    Treatment, simazine, 80% WP

| | | | Water extractable protein (mg./g. fresh wt.) | | Total protein (mg./g. dry wt.) | |
|---|---|---|---|---|---|---|
| Treatment (lb./a.) | Yield (tons/a.) | Dry wt. percent | Mg. | Percent inc. | Mg. | Percent inc. |
| Applied on soil surface at planting: | | | | | | |
| 0 | 3.81 | 8.75 | 5.3 | | 195 | |
| 1/32 | 5.48 | 8.91 | 5.5 | 4 | 203 | 4 |
| 1/16 | 4.53 | 8.89 | 5.7 | 8 | 198 | 2 |
| 1/8 | 5.23 | 8.94 | 5.8 | 9 | 205 | 5 |
| 1/4 | 4.90 | 9.56 | 5.7 | 8 | 200 | 3 |
| Applied on soil surface at planting and July 31: | | | | | | |
| 0 | 5.27 | 8.83 | 5.5 | | 191 | |
| 1/32 | 5.10 | 8.61 | 5.8 | 5 | 201 | 5 |
| 1/16 | 5.00 | 9.08 | 6.1 | 11 | 215 | 13 |
| 1/8 | 5.50 | 9.34 | 5.7 | 4 | 195 | 2 |
| 1/4 | 4.03 | 8.90 | 6.0 | 9 | 200 | 5 |

TABLE 24.—EFFECT OF SIMAZINE ON THE PROTEIN CONTENT OF SOYBEAN

Glycine Max, Merr.:
   Location, East Lansing, Michigan
   Planted, May 25
   Chemical, simazine, 80% WP
   Treated, A, at planting, May 25; B, after emergence, June 26; C, flowering, July 11
   Harvested, October 5

| Treatment (lb./a.) | Yield (lb./a.) | Total[1] protein (mg./g. dry wt.) |
|---|---|---|
| 0 | 1,728 | 337 a |
| ¼ A | 1,700 | 349 b |
| ¼ B | 1,744 | 353 b |
| ¼ C | 1,707 | 351 b |

[1] Means followed by unlike letters are significant at 5% level.

TABLE 25.—INFLUENCE OF SIMAZINE ON YIELD AND PROTEIN CONTENT OF PADDY RICE SEED

Oryza sativa, L. var. Starbonnet:
   Location, Stuttgart, Arkansas
   Application time, applied after flowering

| | | Protein content (mg./g. dry wt.) | | |
|---|---|---|---|---|
| Simazine treatment (lb./a.) | Yield (lb./a.) | Water extractable (mg.) | Inc., percent | Total (mg.) |
| 0 | 5,187 | [1] 10.4 a | | 78.4 |
| 1/16 | 5,210 | 11.3 b | 8 | 80.4 |
| 1/8 | 5,097 | 10.1 a | | 80.3 |
| ¼ | 5,257 | 10.8 ab | 4 | 81.6 |
| ½ | 5,199 | 11.3 b | 8 | 81.7 |
| 1 | 5,195 | 11.5 b | 11 | 80.2 |

[1] Means followed by unlike letters are significantly different at 5% level.

EXAMPLE F

Additional field trials were made at East Lansing and Fremont, Mich. At East Lansing, Mich., there were evaluated the effect of three different application forms of simazine in the treatment of snapbean (Phaseolus vulgaris, L.). Treatments of snapbeans with 80 percent wettable powder of simazine also were made at Fremont, Mich. At East Lansing, Mich., there also were evaluated the effect of simazine on immature rye grain (Secale cereale, L.). Other trials, included in this example, at East Lansing, Mich., were the effect of two different application forms of simazine and one form of terbacil on oats (Avena sativa) at three different times of application. The usual cultural practices for the area involved were followed except for the particularly employed treatments of the various herbicides. Nitrate reductase, protein content, and other analyses were made in the manner described in the preceding examples with other portions of the various trials following the same procedures as described in earlier examples unless stated otherwise. Cultural and other information for these field trials along with their results are presented in the following Tables 26 through 29.

TABLE 26.—EFFECT OF SIMAZINE FORMULATIONS ON THE PROTEIN CONTENT OF SNAPBEAN

Phaseolus vulgaris, L. var. W. S. Greenpod 60209:
   Location, East Lansing, Michigan
   Planting, July 6
   Harvest, September 11–13
   Treatment, simazine treated with the bean as:
      (a) contact spray, 80% WP
      (b) talc formulation, 80% WP
      (c) granular, 4%

| Treatment (lb./a.) | Yield (tons/a.) | Dry wt., percent | Water extractable protein (mg./g. fresh wt.) Mg. | Percent inc. | Total protein (mg./g. dry wt.) Mg. | Percent inc. |
|---|---|---|---|---|---|---|
| (a) Contact spray: | | | | | | |
| 0 | 4.75 | 10.7 | [1] 8.2 a | | 175 | |
| 1/32 | 4.21 | 10.7 | 9.4 a | 14 | 174 | |
| 1/16 | 4.51 | 10.5 | 10.1 ab | 22 | 175 | |
| 1/8 | 4.99 | 10.9 | 10.7 b | 30 | 176 | 1 |
| ¼ | 4.40 | 10.3 | 10.4 | 27 | 179 | 2 |
| (b) Talc formulation: | | | | | | |
| 0 | 5.06 | 10.4 | 8.2 a | | 172 | |
| 1/32 | 4.02 | 10.2 | 9.7 a | 19 | 197 | |
| 1/16 | 4.52 | 10.2 | 9.8 b | 20 | 174 | 1 |
| 1/8 | 4.52 | 10.2 | 11.6 b | 42 | 183 | 6 |
| ¼ | 4.00 | 10.8 | 11.2 b | 37 | 174 | 1 |
| (c) Granular: | | | | | | |
| 0 | 3.50 | 10.3 | 7.9 a | | 175 | |
| 1/32 | 4.61 | 10.4 | 9.1 a | 14 | 173 | |
| 1/16 | 4.13 | 10.3 | 10.2 b | 29 | 181 | 3 |
| 1/8 | 4.63 | 10.4 | 10.3 b | 30 | 183 | 5 |
| ¼ | 4.40 | 10.3 | 11.6 b | 46 | 186 | 6 |

[1] Means followed by unlike letters are significant at 5% level.

TABLE 27.—EFFECT OF SIMAZINE ON PROTEIN CONTENT OF SNAPBEAN

Location, Fremont, Michigan
Planted, June 2
Treated, June 13, 1/8 and 1/16 lb./a. retreated June 28
Harvested, August 7
Chemical, simazine, 80% WP

| | | | | Protein (mg./g.) | | | | | |
|---|---|---|---|---|---|---|---|---|---|
| | | | | Water extractable | | | | Total | |
| Treatment (lb./a.) | Yield (tons/a.) | Dry wt. (percent) | NO₃ (mg./g.) | Fresh wt. | Inc., percent | Dry wt. | Inc., percent | Dry wt. | Inc., percent |
| 0 | 3.96 | 11.3 | 759 | 6.47 | | 57.4 | | 148 | |
| 1/16 | 4.54 | 10.9 | 964 | 7.93 | 23 | 67.0 | 17 | 156 | 5 |
| 1/8 | 3.95 | 11.9 | 636 | 7.40 | 14 | 62.1 | 8 | 154 | 4 |
| ¼ | 3.89 | 10.5 | 858 | 6.10 | | 57.8 | 1 | 151 | 2 |

TABLE 28.—EFFECT OF SIMAZINE ON THE PROTEIN CONTENT OF IMMATURE RYE GRAIN

Secale cereale, L. Var. MSU No. 1:
  Location, East Lansing, Michigan
  Planted, fall of preceding year
  Treated, April 1
  Chemical, simazine, 80% WP
  Harvested, June 21 (mature July 21)

| | | Protein | | | |
|---|---|---|---|---|---|
| | | Water extractable | | Total | |
| | 6 heads (g.) | Mg./g. fresh wt. | Inc., percent | Mg./g. dry wt. | Inc., percent |
| Treatment (lb./a.): | | | | | |
| 0 | [1] 15.7 a | [2] 12.9 a | | [2] 138 a | |
| 1/8 | 13.9 ab | 14.4 b | 11 | 161 b | 16 |
| 1/2 | 15.6 a | 14.3 b | 11 | 155 b | 12 |
| 2 [3] | 11.2 b | 15.0 b | 15 | 159 b | 15 |

[1] Means followed by unlike letters are significant at 5% level.
[2] Means followed by unlike letters are significant at 1% level.
[3] At the relatively mature stage of growth of the rye at the time of treatment, this employed 2 lbs./a. of simazine did not exceed the employable maximum effective amount which is about one-half the phytotoxic amount at this growth stage.

In the description and examples the levels of the employed certain organic chemical agent has been expressed in concentrations of $\mu M.$ (micromoles) and amounts of lbs./acre, depending usually on the particularly described treatment mode. In those expressions as well as in such expressed relationships as "one-half of the phytotoxic amount," there is intended and meant the actual active ingredient content of the particular agent. Thus, when employing a commercially available 80 percent wettable powder (80% WP) simazine, the actual simazine content thereof or active ingredient content is 80 percent. Likewise if the employed composition comprises a granular carrier and 4 percent simazine, the active ingredient content thereof of simazine is only 4 percent.

Although $\mu M.$ and lbs./acre each are accepted usage, depending on whether the treatment be by nutrient application or field application, there are occasions when it be desirable to convert from one to the other. An approximate conversion relationship can be determined ex- TABLE 29.—EFFECT OF HERBICIDES APPLIED AT DIFFERENT TIMES ON THE PROTEIN CONTENT OF OATS [1]

Oats, Avena sativa var. Rodney:
  Location, East Lansing, Michigan
  Planting, April 17
  Treatment, Emergence, May 12; flowering, June 23
  Harvest, August 8

| | | | Protein (mg./g. dry wt.) [2] | | | |
|---|---|---|---|---|---|---|
| | Yield, (bu./a.) | Dry wt., percent | Water ext. | Total | Percent increase Water | Total |
| Chemical, Simazine 80% WP | | | | | | |
| Treatment at emergence (lb./a.): | | | | | | |
| 0 | 29.6 | 84.4 | 40.1 a | 151 a | | |
| 1/16 | 29.1 | 85.0 | 40.3 ab | 163 ab | 0.5 | 8 |
| 1/8 | 30.2 | 86.1 | 44.0 b | 171 b | 10 | 13 |
| 1/4 | 34.2 | 87.2 | 41.6 ab | 157 ab | 4 | 4 |
| Treatment at emergence and flowering: | | | | | | |
| 0 | 34.0 | 87.0 | 39.6 a | 160 a | | |
| 1/16 | 30.4 | 87.8 | 45.4 ab | 169 ab | 15 | 6 |
| 1/8 | 32.7 | 86.7 | 47.5 b | 177 b | 20 | 11 |
| 1/4 | 34.6 | 88.2 | 39.1 ab | 150 ab | | |
| Treatment at flowering: | | | | | | |
| 0 | 38.6 | 87.2 | 39.5 a | 154 a | | |
| 1/10 | 21.9 | 85.9 | 46.0 ab | 167 ab | 17 | 8 |
| 1/8 | 32.1 | 85.0 | 50.4 b | 174 b | 28 | 13 |
| 1/4 | 30.2 | 86.3 | 46.6 ab | 176 ab | 18 | 14 |
| Chemical, Simazine 4% granular | | | | | | |
| Treatment at emergence (lb./a.): | | | | | | |
| 0 | 37.9 | 87.2 | 42.0 | 159 | | |
| 1/32 | 29.0 | 86.4 | 44.7 | 170 | 6 | 7 |
| 1/8 | 39.2 | 88.0 | 43.8 | 166 | 4 | 4 |
| Treatment at emergence and flowering: | | | | | | |
| 0 | 40.4 | 86.4 | 31.4 | 169 | | |
| 1/32 | 32.6 | 87.3 | 35.6 | 177 | 13 | 5 |
| 1/8 | 33.1 | 86.4 | 31.5 | 170 | 0.3 | 0.6 |
| Treatment at flowering: | | | | | | |
| 0 | 44.9 | 86.1 | 31.2 | 160 | | |
| 1/32 | 28.8 | 87.6 | 34.8 | 166 | 8 | |
| 1/8 | 29.9 | 85.0 | 32.8 | 171 | 5 | |

| | Yield | | | Protein (mg./g. dry wt.) [2] | | |
|---|---|---|---|---|---|---|
| | Bu./a. | Inc., percent | Dry wt., percent | Water ext. | Total | Percent increase Water | Total |
| Chemical, Terbacil 80% WP | | | | | | |
| Treatment at emergence: (lb./a.): | | | | | | |
| 0 | 26.7 a | | 86.6 | 34.8 a | 165 | | |
| 1/32 | 51.8 b | 94 | 90.7 | 37.7 b | 168 | 8 | 2 |
| 1/8 | 58.1 b | 118 | 88.1 | 37.3 b | 172 | 7 | 4 |
| Treatment at emergence and flowering: | | | | | | | |
| 0 | 36.6 a | | 86.7 | 30.6 a | 164 | | |
| 1/32 | 49.5 b | 35 | 89.7 | 33.5 b | 168 | 10 | 2 |
| 1/8 | 55.7 | 52 | 89.8 | 33.5 b | 167 | 10 | 2 |
| Treatment at flowering: | | | | | | | |
| 0 | 37.5 a | | 86.3 | 31.0 a | 166 | | |
| 1/32 | 36.8 a | | 86.5 | 33.9 b | 164 | 9 | |
| 1/8 | 26.1 b | | 87.8 | 37.0 b | 168 | 19 | 1 |

[1] Grain with hulls removed.
[2] Means followed by unlike letters are significant at 5% level.

perimentally. Two series of treatments are conducted, one with nutrient solutions of different μM. concentrations and the other by field applications with differing amounts in lbs./acre, with the same agent on like plants the same particular susceptible crop plant at a closely approximated same growth or development stage. Like results in the series of the two treatments are matched to arrive at an approximate correlation of μM. to lbs./acre. In this manner employing simazine for treating rye grass in its germinating seedling or first week of growth stage one arrives at that: 0.025 μM. approximates 1/32 lb./acre; 0.05 μM. approximates 1/16 lb./acre; 0.1 μM. approximates 1/8 lb./acre; 0.2 μM. approximates 1/4 lb./acre; 0.4 μM. approximates 1/2 lb./acre; etc. In a similar manner one skilled in the art can with various agents and susceptible crop plants determine similar correlations and useful conversion means. It should be noted that each such determined approximate conversion means apparently holds valid only for that particular agent, plant and plant growth change at which it was determined, and if such factors of agent, plant and plant growth stage are varied, that a somewhat different approximate conversion means be obtained.

While the invention has been described and specifically illustrated with certain materials, at certain conditions, and in particular embodiments thereof, it is to be understood that other embodiments, modifications and variations will be obvious therefrom and apparent to those skilled in the art, and that all such obvious embodiments, modifications and variations as fall within the true scope of the invention are intended to be encompassed within the appended claims.

What is claimed is:

1. A method for increasing the total protein content of a susceptible crop plant, which will be killed in its seedling and germinating-seed stage in the field by application of 2 lbs./acre of the hereafter defined organic chemical agent, which method comprises:
   (a) subjecting the susceptible crop plant during growth to an environment containing
      (i) a nitrate source of a nitrogen plant nutrient, and
      (ii) an effective amount not exceeding ½ lb./acre and up to one-half of the amount phytotoxic of an organic chemical agent selected from the group consisting of a triazine of the structure of

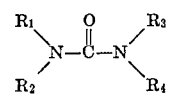

wherein:

$R_1$ and $R_3$ represent the hydrogen atom or the ethyl radical, $R_2$ and $R_4$ represent lower alkyl radicals, which may be the same or different, and $R_5$ represents a halogen atom or a methylmercapto radical;

a uracil of the structure of

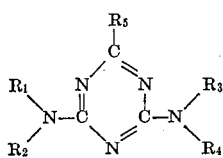

wherein:

$R_1$ and X together are a lower alkene radical, or separately

X represents a chlorine or bromine atom, and $R_1$ represents the methyl radical, and whether $R_1$ and X are together or separate then, $R_2$ is the isopropyl radical, or the sec or tert-butyl radical, or the cyclohexyl radical; and a phenyl-substituted urea of the structure of

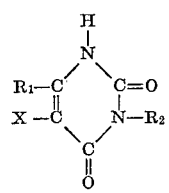

wherein:

$R_1$ represents the phenyl radical, or the 4-bromophenyl radical, or the 4-chlorophenyl radical, or the 3,4-dichlorophenyl radical, or the 4-(p-chlorophenoxy) phenyl radical, or the m-trifluromethylphenyl radical, $R_2$ represents the hydrogen atom, $R_3$ represents the hydrogen atom, or the methyl radical, or n-butyl radical, and $R_4$ represents a lower alkyl radical or a lower alkoxy radical, or the 2-methyl cyclohexyl radical;

whereby the resulting grown plant contains an increased total protein content over that of a like plant grown in the same environment except for an absence of said organic chemical agent.

2. The method of claim 1 employing that effective amount which is at least one thirty-second lb./acre of said organic chemical agent.

3. The method of claim 1 employing that effective amount which is less than one-half lb./acre of said organic chemical agent.

4. The method of claim 1 employing that effective amount which is between one-fourth and one-eighth the amount phytotoxic to the susceptible crop plant.

5. The method of claim 4 in which there is included an applying of said agent in an amount requisite to provide said effective amount in said environment.

6. The method of claim 4 in which there is included more than one applying of said agent so as to maintain said effective amount in said environment during at least a major portion of the period between planting and harvesting of said plant.

7. The method of claim 5 in which the applying is to a locale permitting take-up of said agent by roots of said plant.

8. The method of claim 5 employing said triazine as said agent.

9. The method of claim 8 employing 2-chloro-4,6-bis (ethylamino)-1,3,5-triazine as said agent.

References Cited

UNITED STATES PATENTS

| 3,374,083 | 3/1968 | Loux | 71—92 |
| 3,291,592 | 12/1966 | Evans | 71—92 |
| 3,175,896 | 3/1965 | Arndt et al. | 71—93 |
| 3,037,853 | 6/1962 | Luckenbaugh | 71—93 |
| 2,720,480 | 10/1955 | Wolf | 167—33 |

OTHER REFERENCES

"The increase in nitrate reductase activity and protein content of plants treated with simazine." Ries et al. Chemical Abstracts vol. 67 (1967).

(Other references on following page)

OTHER REFERENCES

"Effect of amitriale upon nucleic acid and protein metabolism of wheat seedlings." Bertels et al. Chemical Abstracts vol. 63 (1965).

"Effect of simazine on nitrogenous components of corn." Ries et al. Chemical Abstracts, vol. 63 (1965).

"Effect of certain herbicides on the yield and starch content of potatoes." Mashtakov et al. Chemical Abstracts, vol. 62 (1965).

"Action of certain herbicides on carbohydrate-nitrogen metabolism in cotton plants." Balandina. Chemical Abstracts, vol. 61.

Tweedy et al. "Effect of simazine on nitrate reductase activity on corn." Plant Physiology (1967) vol. 42, pp. 280–282.

LEWIS GOTTS, Primary Examiner

C. L. MILLS, Assistant Examiner

U.S. Cl. X.R.

71—92, 120

PO-1050
(5/69)

UNITED STATES PATENT OFFICE
CERTIFICATE OF CORRECTION

Patent No. 3,567,424          Dated March 2, 1971

Inventor(s) Stanley K. Ries

It is certified that error appears in the above-identified patent and that said Letters Patent are hereby corrected as shown below:

Column 8, about line 22, that portion of the formula reading $\begin{matrix} R \\ \phantom{x} \\ \phantom{x} \end{matrix} \!\! N-$     should read     $\begin{matrix} R_1 \\ \phantom{x} \\ \phantom{x} \end{matrix} \!\! N-$ Column 8, line 55, reading "3-(4-bromophenyl)-meth-" should -- 3-(4-bromophenyl)-1-meth- --. Column 10, TABLE ONE, in t horizontal line reading "2.40" under the vertical column hea "II", insert -- 12.7 --. Column 12, TABLE 1, in the heading the far right vertical column, "tota" should read -- total - same heading, the superscript reference -- 1 -- should follc "plant". Column 13, in the heading of TABLE 3, "cucumber" s read -- lettuce --; in the far left vertical column of TABLE "0.05" should read -- 0 --. Column 14, TABLE 4, the far rig principal vertical column's heading reading "Water extractab should read -- Water extractable protein (mg/g)$^1$ --; same ta under the far right vertical column headed "Fresh wt. (perce inc.)", the "30" should be omitted and replaced by a dash (- the blank space located on the horizontal line commencing "C should have inserted therein -- 30 --. Column 16, TABLE 8, reference superscript "1" should read -- 2 -- in the far rig vertical column heading. Bridging Columns 17 and 18, in the heading of TABLE 12, the reference superscript "2" following "SEEDS" should read superscript -- 1 --. Column 20, TABLE 1 under the far left vertical column, the last entry "1" shoul include the reference superscript -- 6 --. Column 21, TABLE under the far left vertical column, the entry reading "3/4" should read -- 1/4 --. Column 26, TABLE 26, in the second f the right vertical column headed "Mg." and on the second- occurring horizontal line commencing "1/32", the value "197" should read -- 177 --. Column 27, TABLE 29, under the far l vertical column, the value of "1/6" at each of its two occur rences should read -- 1/8 --.

Signed and sealed this 3rd day of August 1971.

(SEAL)
Attest:

EDWARD M. FLETCHER, JR.
Attesting Officer

WILLIAM E. SCHUYLER, JF
Commissioner of Patent: